United States Patent [19]
Cesaroni

[11] Patent Number: 5,114,776
[45] Date of Patent: May 19, 1992

[54] CORRUGATED THERMOPLASTIC SHEET HAVING FLUID FLOW PASSAGES

[76] Inventor: Anthony J. Cesaroni, 9 Heathmore Court, Unionville, Ontario, Canada, L3R 8J1

[21] Appl. No.: 545,087

[22] Filed: Jun. 28, 1990

[30] Foreign Application Priority Data

Jul. 28, 1989 [GB] United Kingdom ............... 8917241

[51] Int. Cl.⁵ .............................................. B32B 3/10
[52] U.S. Cl. .................................. 428/131; 428/136; 428/163; 428/165; 428/182; 428/183; 210/493.2; 210/500.38; 165/166; 165/167; 165/171
[58] Field of Search ............ 428/131, 136, 163, 165, 428/182, 183; 210/490, 493.2, 500.2, 488; 165/167, 166, 171

[56] References Cited

U.S. PATENT DOCUMENTS 3,590,917 2/1971 Huber .................................. 165/167
4,555,342 11/1985 Grant ................................ 210/493.4

FOREIGN PATENT DOCUMENTS 0286399 12/1988 European Pat. Off. ............ 210/488
0286400 12/1988 European Pat. Off. ............ 210/488

Primary Examiner—Ellis P. Robinson
Assistant Examiner—J. Weddington

[57] ABSTRACT

A corrugated sheet formed from a thermoplastic polymer is disclosed. The sheet has a plurality of fluid flow passages through each corrugation. At least one slope, and preferably both slopes, of each corrugation has a plurality of slits in side-by-side arrangement extending through the sheet, with the fluid flow passages being formed by displacement of the thermoplastic polymer between each pair of slits relative to the thermoplastic polymer between the pairs of slits adjacent thereto. One example of use of the corrugated sheet is in a panel heat exchanger, to cause turbulence in fluid passing through the heat exchanger. The preferred thermoplastic polymer is polyamide.

9 Claims, 2 Drawing Sheets

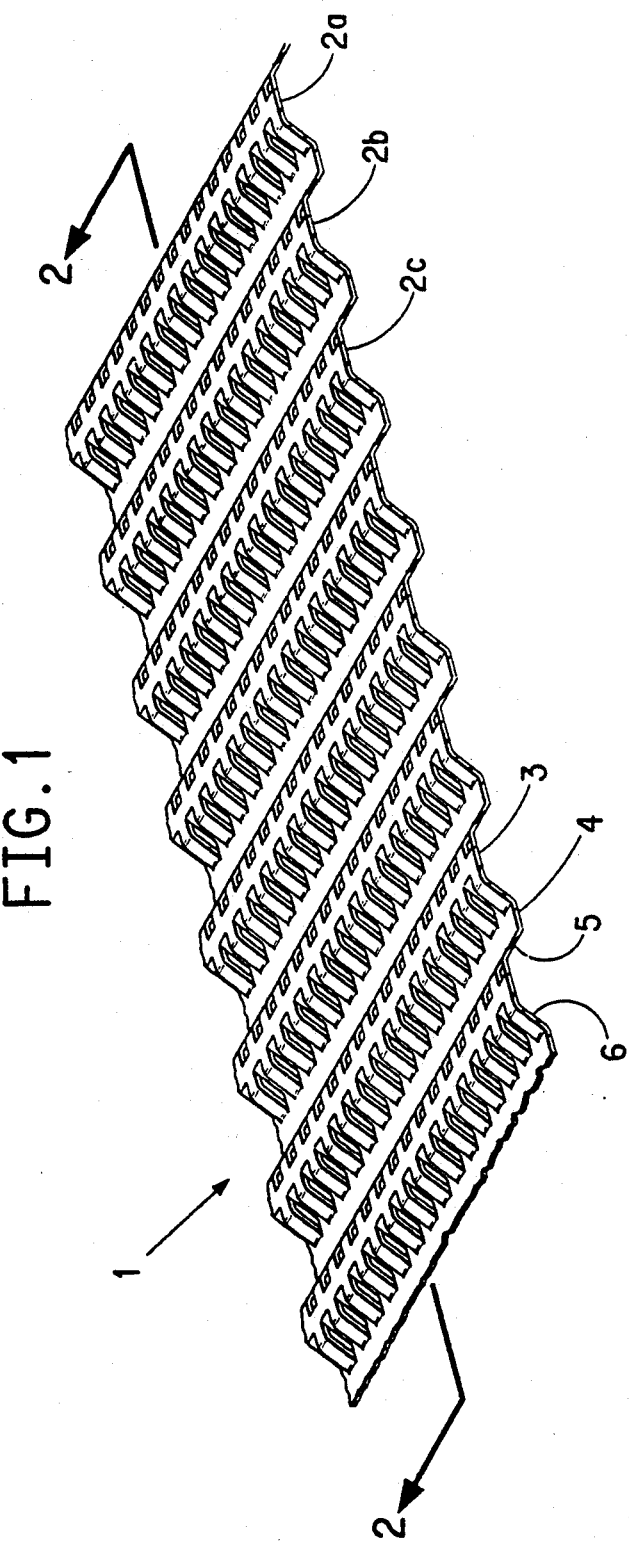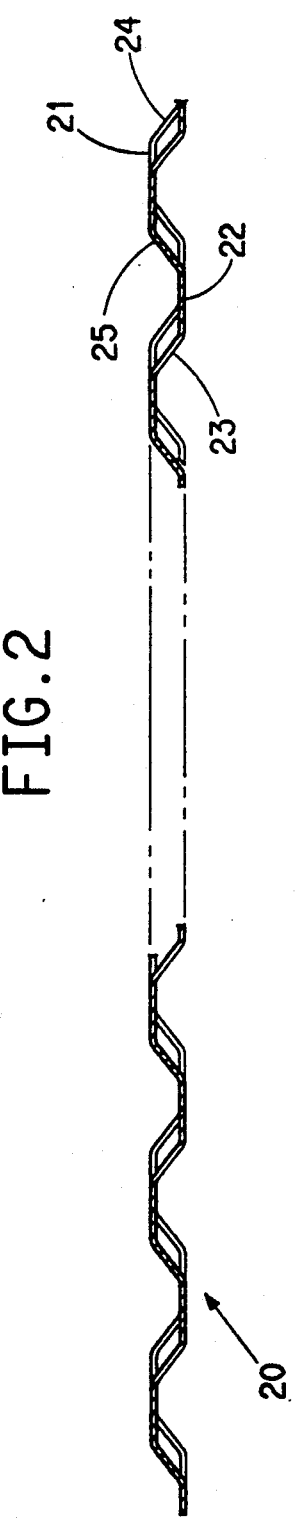

CORRUGATED THERMOPLASTIC SHEET HAVING FLUID FLOW PASSAGES

The present invention relates to corrugated sheet formed from a thermoplastic polymer and having fluid flow passages through the sheet, such passages having been formed by relative displacement of sections of the sheet. In embodiments, the corrugated sheet may be used in the fabrication of panel heat exchangers formed from thermoplastic polymer compositions, especially polyamide compositions.

Plate or panel heat exchangers manufactured from thermoplastic polymers, and methods for the manufacture of such heat exchangers, are known e.g. the panel heat exchangers disclosed in published European patent applications Nos. 0 286 399 and 0 286 400, of A. J. Cesaroni and J. P. Shuster, both published Oct. 12, 1988 in published European patent application No. 0 304 261 of A. J. Cesaroni, published Feb. 22, 1989 in published European patent application No. 0 337 802 of A. J. Cesaroni and J. P. Shuster, published Oct. 18, 1989 and in U.K. patent application No. 89/010966 of E. L. Fletcher, filed May 12, 1989. The above patent applications disclose methods for the manufacture of thermoplastic panel heat exchangers, especially panel heat exchangers formed from compositions of polyamides.

Polyamides offer a number of advantages as the material of construction of thermoplastic panel heat exchangers. In particular, polyamides may provide sufficient strength, toughness and chemical resistance properties at elevated temperatures to enable panel heat exchangers formed from polyamides to be used in such demanding applications as oil coolers in automotive end-uses.

There are, however, difficulties in the fabrication of panel heat exchangers from polyamides in an efficient manner, especially with respect to the forming of fluid passages and other sections of the panel heat exchanger and to the bonding together of the parts of the heat exchanger.

A corrugated sheet that is capable of being used in such heat exchangers as part of the fluid flow passages thereof, and in other end-uses, has now been found.

Accordingly, the present invention provides a corrugated sheet formed from a thermoplastic polymer composition and having a plurality of fluid-flow passages through each corrugation, each corrugation having peaks and troughs with slopes between them, at least one slope of each corrugation having a plurality of slits in side-by-side arrangement extending through the sheet, the fluid-flow passages being formed by alternate displacement of the thermoplastic polymer between successive slits.

In a preferred embodiment of the corrugated sheet of the present invention, both slopes of each corrugation have fluid flow passages, the slits preferably being perpendicular to the longitudinal direction of the corrugations.

In a further embodiment, the fluid flow passages of each corrugation are staggered relative to the passages on the adjacent corrugation, especially staggered in the direction transverse to the corrugations.

In another embodiment, the corrugations are substantially sinusoidal in cross-section, or the corrugations resemble a square wave in cross-section with the slopes of the corrugations preferably being substantially at right angles to the plane of the sheet, and the peaks and troughs are preferably substantially parallel to the plane of the sheet.

In yet another embodiment, the thermoplastic polymer composition is a polyamide composition.

In a further embodiment, the corrugated sheet has sufficient stiffness to retain its shape when not subjected to compressive forces i.e. it is self supporting.

In a still further embodiment, the corrugated sheet is flexible, elastomeric and/or compressible.

The present invention also provides a panel heat exchanger formed from at least two panels and having fluid inlet and outlet means located in a spaced apart relationship, said heat exchanger having corrugated sheet located between the panels and extending substantially between the inlet and outlet means, said corrugated sheet being formed from a thermoplastic polymer composition and having a plurality of fluid-flow passages through each corrugation, each corrugation having peaks and troughs with slopes between them, at least one slope of each corrugation having a plurality of slits in side-by-side arrangement extending through the sheet, the fluid-flow passages being formed by alternate displacement of the thermoplastic polymer between successive slits.

The present invention relates to corrugated sheet formed from a thermoplastic polymer composition, and will be particularly described with reference to the embodiments shown in the drawings, in which:

FIG. 1 is a perspective view of an embodiment of a corrugated sheet of the present invention;

FIG. 2 is a side view of the corrugated sheet of FIG. 1, through A—A of FIG. 1.

Figure 3:
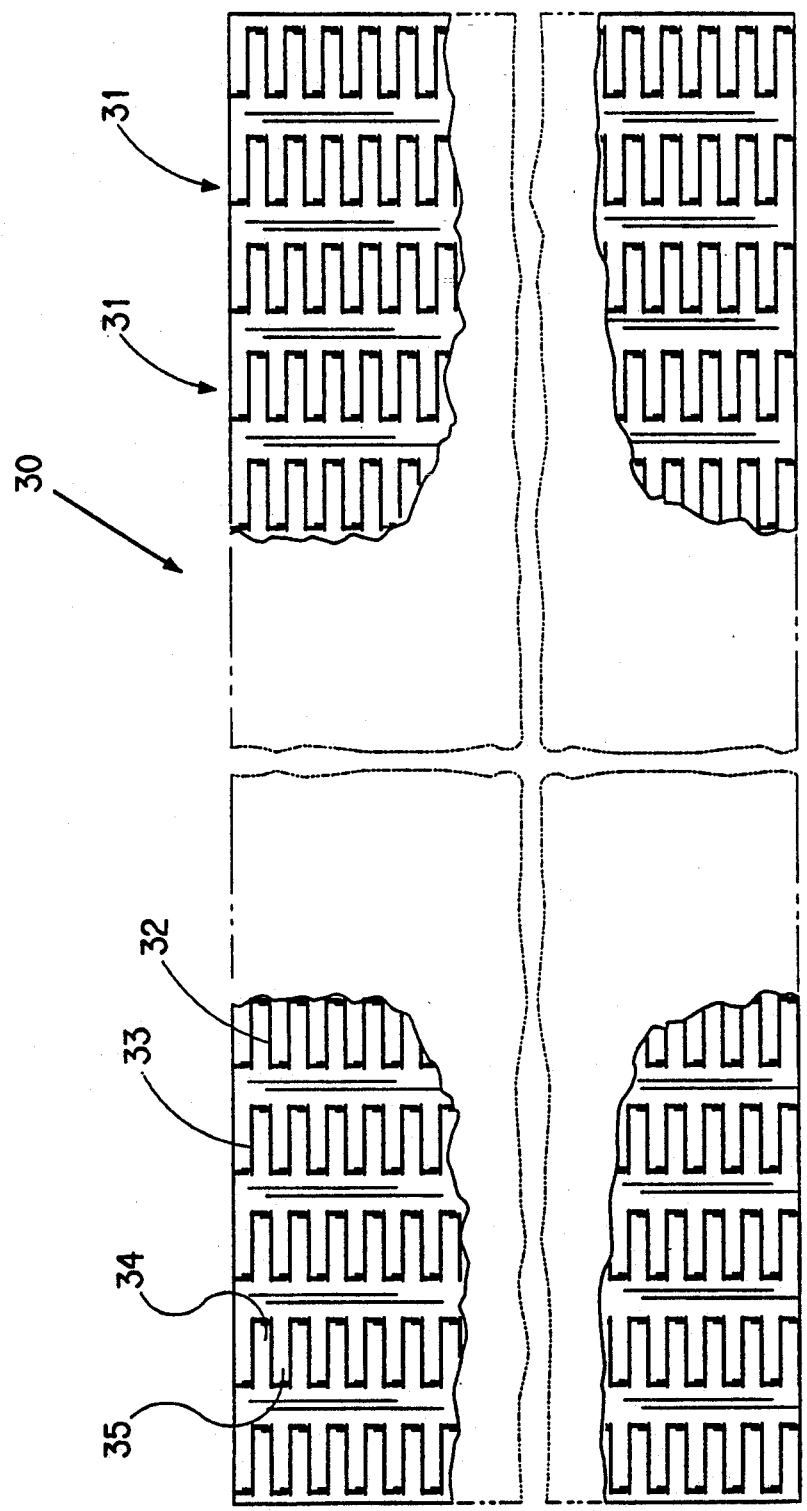
FIG. 3 is a top view of the corrugated sheet of FIG. 1 and 2.

FIG. 1 shows a corrugated sheet, generally indicated by 1. Sheet 1 has a plurality of corrugations 2, indicated in FIG. 1 as 2a, 2b and 2c, such corrugations being parallel to each other and arranged in a direction that may be referred to herein as the transverse direction of sheet 1. Each corrugation 2 has a peak 3, a trough 4 and slopes 5 and 6. As shown in FIG. 1, peak 3 and trough 4 of corrugations 2 tend to be formed of sections of sheet that are partially planar and substantially parallel to the longitudinal direction of the sheet. In embodiments, peak 3 and trough 4 of corrugations 2 may be rounded, even substantially sinusoidal in cross-section, but in preferred embodiments peak 3 and trough 4 are, in part, planar and parallel to the transverse direction of sheet 1. In further embodiments, the slopes of the corrugations are substantially at right angles to the plane of the sheet.

Each of slopes 5 and 6 has a plurality of slits 7, which are more readily seen in FIG. 3; as shown, slits 7 are parallel to each other and transverse to corrugations 2 of corrugated sheet 1, but other arrangements may be used. The section 8 of sheet 1 between successive slits 7 has been displaced in position relative to the sections 9 and 10 of sheet 1 immediately adjacent thereto, sections 9 and 10 being located between adjacent and successive slits 7. The amount of displacement of section 8 relative to sections 9 and 10 is sufficient to form a fluid flow passage between section 8 and each of sections 9 and 10.

FIG. 2 shows a side view of corrugated sheet 1, along A—A of FIG. 1. The corrugated sheet has a plurality of corrugations, generally indicated by 20. Each corrugation 20 has a peak 21 and a trough 22. Between peak 21 and trough 22, the sheet has sections 23 and 24 that are of substantially the same shape and which are displaced relative to each other. Sections 23 and 24 correspond to sections 8-10 of sheet 1 of FIG. 1 i.e. the sections between adjacent and successive slits. The displacement of sections 23 and 24 relative to each other has formed fluid flow passage 25 passing through sheet 1; thus, fluid flow passage 25 permits fluid to pass from the space above sheet 1 to the space below sheet 1, and vice versa. In the embodiment shown, fluid flow passages 25 are provided in the slopes on each side of the corrugation.

Sheet 1 is shown in top view in FIG. 3. The sheet, generally indicated by 30, has a plurality of corrugations 31. Corrugations 31 have a plurality of slits 32 and 33 on opposing slopes of each corrugation. As shown in FIG. 3, all of slits 32 and 33 are parallel to the longitudinal direction of the sheet 30 i.e. transverse to corrugations 31. Sections 34 and 35, formed between successive slits of corrugated sheet 30 are displaced relative to each other i.e. at least one of sections 34 and 35 is displaced up or down from the contour of sheet 30, such that a relative displacement of sections 34 and 35 occurs.

In an embodiment of the corrugated sheet, which is shown in particular in FIG. 3, a section 34 in the slope of one corrugation is displaced in a different direction from the displacement of the transversely adjacent section on the other slope of the same corrugation and/or the corresponding section in the adjacent slope of the next corrugation. Such an alternating nature of the displacement of sections tends to facilitate admixing of fluid, if fluid is being passed longitudinally along the corrugated sheet as in use in a panel heat exchanger, and is generally referred to herein as staggering of the displaced sections of the sheet; use of corrugated sheet of the present invention in panel heat exchangers is disclosed in greater detail in the patent application of A. J. Cesaroni filed concurrently herewith.

In preferred embodiments, the corrugated sheet has sufficient stiffness to substantially retain its shape when not subjected to compressive forces. Thus, while the corrugated sheet per se may be flexible, and is preferably so, the sections of the sheet retain their shape when not subjected to compression i.e. the sheet is self-supporting. In addition, the corrugated sheet may have elastomeric properties, be compressible and be flexible.

The corrugated sheet of the present invention has a variety of potential uses, including in panel heat exchangers as described herein to create turbulence in fluid passing through the heat exchanger, and thereby facilitate more effective heat transfer. However, the corrugated sheet may be used in other end-uses where fluid flow passages are desirable, and even in other end-uses e.g. not involving flow of fluid, in which compressive or other properties of the corrugated sheet may be used to advantage.

A particular use of the corrugated sheet of the present invention is in a panel heat exchanger, especially a panel heat exchanger formed from a material that may be bonded to the thermoplastic material of the corrugated sheet, as disclosed in the aforementioned copending patent application of A. J.. Cesaroni filed concurrently herewith. In such a use, the corrugated sheet is bonded, on both sides and at the peaks and troughs of the corrugations, to sheets of thermoplastic polymer, such sheets forming walls of the panel heat exchanger; the corrugated sheet, which requires fluid flow passages on both slopes of each corrugation, acts to cause turbulence in fluid passed through the panel heat exchanger i.e. longitudinally along the corrugated sheet, and thereby improve heat transfer in the heat exchanger. In use in a panel heat exchanger, the peaks and troughs of the corrugated sheet should be planar, and especially parallel to the plane of the corrugated sheet in order to facilitate the formation of bonds of adequate strength between the corrugated sheet and the sheets of thermoplastic polymer to form the panel heat exchanger.

In embodiments, the corrugated sheet may be formed from a variety of polyamide compositions. The composition selected will depend primarily on the end use intended for the corrugated sheet, especially the temperature of use and the environment of use, including any fluid that may be contacted with the corrugated sheet.

Examples of polyamides are the polyamides formed by the condensation polymerization of an aliphatic dicarboxylic acid having 6-12 carbon atoms with an aliphatic primary diamine having 6-12 carbon atoms. Alternatively, the polyamide may be formed by condensation polymerization of an aliphatic lactam or alpha, omega aminocarboxylic acid having 6-12 carbon atoms. In addition, the polyamide may be formed by copolymerization of mixtures of such dicarboxylic acids, diamines, lactams and aminocarboxylic acids. Examples of dicarboxylic acids are 1,6-hexanedioic acic (adipic acid), 1,7-heptanedioic acid (pimelic acid, 1,8-octanedioic acid (suberic acid), 1,9-nonanedioic acid (azelaic acid), 1,10-decanedioic acid (sebacic acid) and 1,12-dodecanedioic acid. Examples of diamines are 1,6-hexamethylene diamine, 1,8-octamethylene diamine, 1,10-decamethylene diamine and 1,12-dodecamethylene diamine. An example of a lactam is caprolactam. Examples of alpha, omega aminocarboxylic acids are amino octanoic acid, amino decanoic acid and amino dodecanoic acid. Preferred examples of the polyamides are polyhexamethylene adipamide and polycaprolactam, which are also known as nylon 66 and nylon 6, respectively.

The corrugated sheet of the present invention has been described with particular reference to the use of polyamides as the polymer used in the fabrication of the sheet. It is to be understood, however, that other polymers may be used, the principal considerations being the environment of use of the sheet and physical characteristic or properties of the sheet. Examples of other thermoplastic polymers that may be formed into sheets are fluorocarbon polymers, polyesters, thermoplastic and thermoset elastomers e.g. polyetherester elastomers, neoprene, chlorosulphonated polyethylene, and ethylene/propylene/diene (EPDM) elastomers, polyvinyl chloride and polyurethane.

In preferred embodiments of the corrugated sheet of the present invention, the sheet has a thickness of less than 0.7 mm, and especially in the range of 0.07-0.50 mm, particularly 0.12-0.30 mm. The thickness of the sheet will, however, depend to a significant extent on the proposed end use and especially the properties required for that end use.

The polymer compositions used in the fabrication of the corrugated sheet may contain stabilizers, pigments, fillers, including glass fibres, and the like, as will be appreciated by those skilled in the art. In addition, the corrugated sheet may be a laminated sheet e.g. a sheet formed from two or more layers of polymer and one or more layers of a fabric, especially a glass fabric. In preferred embodiments, any such fabric is a thin fabric with a high degree of flexibility. The corrugated sheet may also be a laminate with e.g. thin films of aluminum or stainless steel screens.

In a embodiment, the corrugated sheet may be manufactured using a punch and die set. Using such a method, the punch and die are heated to soften the polymer e.g. in one embodiment of the manufacture of corrugated sheet from nylon 66, to a temperature of about 150° C. The corrugated sheet is then formed by sequentially punching the corrugations along a length of sheet. The method may be carried out as a continuous or semi-continuous process.

The present invention is illustrated by the following examples.

EXAMPLE I

A sample of fine glass cloth having a thickness of 0.0127 mm was placed between two elongated samples of polyamide (nylon 66) film, each of which had a thickness of 0.076 mm. The glass cloth was oriented so that the warp and weft fibres were at an angle to the longitudinal direction of the elongated samples of polyamide film, to facilitate subsequent moulding of a panel heat exchanger. Each polyamide film had a coating of an admixture of 80% by weight of phenol, 12% by weight of benzyl alcohol and 8% by weight of methanol on the surface that contacted the glass cloth. The resultant sandwich of films and cloth was placed between two sheets, having a thickness of 1.6 mm, formed from a silicone material, to reduce any tendency for bubble formation in the subsequent lamination process. The sandwich was laminated using a platen press, between sections of a mould each having a depth of about 1.5 mm, and at a pressure of 0.6 mPa and a temperature of 160° C. for about 3 minutes.

Corrugated sheet of the type shown in the drawings was formed from the resultant laminate using a punch and die set. The die had a depth of about 3 mm, which corresponded to the height of the corrugation that was to be formed. The die also had a step of about 2.5 mm at its front edge, which corresponded to the spacing between corrugations formed on the sheet. The punch and die was cooperatively arranged to form corrugations of the type shown in the drawings.

The punch and die were heated to about 150° C. A strip of the laminate was then laid on the die, and the punch was lowered. A pressure of about 0.7 mPa was then applied for about 3 seconds, after which the punch was withdrawn. The punched portion of the strip of laminate was then placed on the step of the die, and the procedure repeated. A corrugated sheet of the laminate was thus formed.

EXAMPLE II

The procedure of Example I was repeated using a sample of 105 mesh stainless steel screen having a thickness of 0.15 mm, instead of the glass cloth. Corrugated sheet was formed.

In addition, corrugated sheets have been made using polyamide films having thicknesses of from 0.20 to 0.50 mm.

EXAMPLE III

A two-part mould was machined from aluminum, the first or lower part having a thickness of 2.54 cm and the second or top part having a thickness of 0.94 cm. The heat exchanger had a length of approximately 40 cm and a depth of approximately 0.015 cm.

Pieces of polyamide sheet corresponding to the shape of the cavity of the mould were placed in the mould. Distribution rings that formed part of the inlet and outlet means were located between the sheets, and corrugated sheet of the invention was placed between the sheets so as to substantially occupy the space between the distribution rings. Both pieces of polyamide sheet and the corrugated sheet had been coated with a mixture of phenol (80%), benzyl alcohol (12%) and methanol (8%) to promote adhesion in the areas to be bonded.

The press was closed and a pressure of 5.9 mPa was applied at a mould temperature of about 160° C.; nitrogen was applied to the mould at a pressure of about 1.7-2.1 mPa. After about three minutes, the moulded panel heat exchanger was removed from the mould and trimmed around the edges.

A panel heat exchanger containing the corrugated sheet was formed.

This example shows a use of corrugated sheet of the invention.

In embodiments, both the panel and the corrugated sheet of the panel heat exchanger have been made using laminates as described in Examples I and II, and using polyamide films having thicknesses of 0.20-0.50 mm.

What is claimed is:

1. A corrugated sheet having a plurality of corrugations formed from a thermoplastic polymer composition and having a plurality of fluid-flow passages through each corrugation, each corrugation having peaks and troughs with slopes between them, the slope of each corrugation having a plurality of slits in side-by-side arrangement extending through the sheet, the fluid-flow passages being formed by alternate displacement of the thermoplastic polymer between successive slits and being staggered relative to passages on adjacent corrugations said sheet being flexible, elastomeric and/or compressible, 2. The corrugated sheet of claim 1 in which the fluid flow passages are staggered in the direction transverse to the corrugations.

3. The corrugated sheet of claim 1 in which the slits are parallel to the transverse direction of the corrugations.

4. The corrugated sheet of claim 1 in which the thermoplastic polymer composition is a polyamide composition.

5. The corrugated sheet of any one of claims 1, 2, 3 or 4 in which the corrugated sheet is self-supporting.

6. The corrugated sheet of claim 1 in which the corrugations are substantially sinusoidal in cross-section.

7. The corrugated sheet of claim 1 in which the corrugations resemble a square wave in cross-section.

8. The corrugated sheet of claim 7 in which the slopes of the corrugations are substantially at right angles to the plane of the sheet.

9. The corrugated sheet of claim 7 in which the peaks and troughs of each corrugation are substantially parallel to the plane of the sheet.

* * * * *